(12) United States Patent
Schwab

(10) Patent No.: US 12,687,726 B2
(45) Date of Patent: Jul. 21, 2026

(54) DISPLAY DEVICE

(71) Applicant: tooz technologies GmbH, Aalen (DE)

(72) Inventor: Markus Schwab, Aalen (DE)

(73) Assignee: tooz technologies GmbH, Aalen (DE)

( * ) Notice: Subject to any disclaimer, the term of this patent is extended or adjusted under 35 U.S.C. 154(b) by 319 days.

(21) Appl. No.: 18/558,685

(22) PCT Filed: Apr. 27, 2022

(86) PCT No.: PCT/US2022/061143
§ 371 (c)(1),
(2) Date: Nov. 2, 2023

(87) PCT Pub. No.: WO2022/233656
PCT Pub. Date: Nov. 10, 2022

(65) Prior Publication Data
US 2024/0231107 A1 Jul. 11, 2024

(30) Foreign Application Priority Data

May 4, 2021 (DE) .......................... 102021111515.9

(51) Int. Cl.
*G02B 27/01* (2006.01)
*G02B 27/09* (2006.01)
(52) U.S. Cl.
CPC ..... *G02B 27/0172* (2013.01); *G02B 27/0176* (2013.01); *G02B 27/0955* (2013.01); *G02B 27/0977* (2013.01); *G02B 2027/0178* (2013.01)
(58) Field of Classification Search
CPC ........... G02B 27/0172; G02B 27/0176; G02B 27/0955; G02B 27/0977; G02B 2027/0178; G02B 2027/0181
See application file for complete search history.

(56) References Cited

U.S. PATENT DOCUMENTS

2012/0242561 A1 9/2012 Sugihara
2017/0299868 A1 10/2017 Widulle
(Continued)

FOREIGN PATENT DOCUMENTS

DE 102010041343 A1 3/2012
DE 102010041349 A1 3/2012
(Continued)

OTHER PUBLICATIONS

International Preliminary Report on Patentability rendered by the International Bureau of WIPO for PCT/ EP2022/061143, dated Oct. 24, 2023, 7 pages.

(Continued)

*Primary Examiner* — Collin X Beatty
(74) *Attorney, Agent, or Firm* — Skaar Ulbrich Macari, P.A.

(57) ABSTRACT

In a spectacle lens of a display device the coupling-in portion has an entry surface which is wider in the first direction than the image of the imager, and it is possible to adjust the entry surface coupling-in position at which the image is coupled in via the entry surface in the first direction. The coupling-in position determines the coupling-out direction of the coupling-out portion of the spectacle lens, and therefore the position of the exit pupil in the first direction such that the distance between the exit pupil and the coupling-in portion in the first direction can be adjusted. Irrespective of the coupling-in position, when the deflecting structure causes a deflection, the deflecting structure is always utilized across the entire predetermined extension in the first direction.

14 Claims, 4 Drawing Sheets

(56)         References Cited

U.S. PATENT DOCUMENTS

| | | |
|---|---|---|
| 2020/0116907 A1 | 4/2020 | Rudolph et al. |
| 2020/0209625 A1 | 7/2020 | Takeda et al. |
| 2020/0355924 A1 | 11/2020 | Dobschal et al. |
| 2022/0137415 A1* | 5/2022 | Noguchi ............ G02B 17/0816 |
| | | 359/630 |

FOREIGN PATENT DOCUMENTS

| | | |
|---|---|---|
| DE | 102011007811 A1 | 10/2012 |
| DE | 102018102468 A1 | 8/2019 |
| JP | 2008061052 A | 3/2008 |
| JP | 2010226661 A | 10/2010 |

OTHER PUBLICATIONS

International Search Report rendered by the International Bureau of WIPO for PCT/EP2022/061143, dated Aug. 16, 2022, 2 pages.

* cited by examiner

DISPLAY DEVICE

PRIORITY

This application claims the priority of German patent application DE 10 2021 111 515.9 filed May 4, 2021, which is hereby incorporated herein by reference in its entirety.

FIELD

The present invention relates to a display device which can be placed onto the head of a user and presents the user with a virtual image via a spectacle lens.

BACKGROUND

Such display devices are faced with the problem that different users have different temple-eye distances, and so relative to the user's temple the position for the virtual image may vary in a lateral direction from user to user.

SUMMARY

An object of the invention is to provide a display device which allows a simple adaptation to different temple-eye distances.

Since the position of the exit pupil in the first direction is defined by way of the position of the input coupling location of the generated image, an adaptation to different temple-eye distances can easily be carried out in this way.

Furthermore irrespective of the input coupling location, when the deflection structure causes a deflection, the deflection structure is always utilized over the entire predetermined extent along the first direction. This enables the deflection structure to be configured very compactly in the first direction.

If an intermediate imaging of the image is present within the spectacle lens between input coupling portion and output coupling portion, the spectacle lens can be configured very compactly. Furthermore, it is possible to introduce one or two additional correction mirrors, for example, owing to the larger optical path length then present. This enables the system to be corrected more easily and more flexibly, with a better distortion and spot size being able to be achieved.

The spectacle lens according to certain example embodiments realizes by itself (or with an additional optical unit which can be arranged between image generator and entrance surface of the spectacle lens) an imaging optical unit which images the generated image of the image generator such that the user can perceive it as a virtual image. In this case, the imaging optical unit is configured such that the input coupling location of the entrance surface at which the generated image is coupled in defines the output coupling direction of the output coupling portion and thus the position of the exit pupil in the first direction.

Furthermore, the imaging optical unit can be realized in telecentric fashion on the image generator side, for example. It is then possible, by means of a z-displacement of the image generator (or a change in the distance between image generator and spectacle lens), for the virtual position likewise to be displaced in the z-direction, without the field of view being altered.

The spectacle lens can be produced from plastic or glass. In particular, the spectacle lens can be configured in integral or multipartite fashion.

The deflection structure can be configured as a single continuous mirror surface. The mirror surface can be partly reflective. However, it is also possible for the mirror surface to have the highest possible reflectivity of almost 100%.

Furthermore, the deflection structure can comprise a plurality of mirror surfaces offset with respect to one another and can be configured in particular as a reflective or partly reflective Fresnel structure.

It goes without saying that the features mentioned above and those yet to be explained below can be used not only in the combinations specified but also in other combinations or on their own, without departing from the scope of the present invention.

The invention will be explained in even greater detail below on the basis of exemplary embodiments with reference to the accompanying drawings, which likewise disclose features essential to the invention. These exemplary embodiments are provided for illustration only and should not be construed as limiting. For example, a description of an exemplary embodiment having a multiplicity of elements or components should not be construed as meaning that all of these elements or components are necessary for implementation. Rather, other exemplary embodiments may also contain alternative elements and components, fewer elements or components, or additional elements or components. Elements or components of different exemplary embodiments can be combined with one another, unless stated otherwise. Modifications and variations that are described for one of the exemplary embodiments can also be applicable to other exemplary embodiments. In order to avoid repetition, elements that are the same or correspond to one another in different figures are denoted by the same reference signs and are not explained repeatedly.

DETAILED DESCRIPTION

Figure 1:
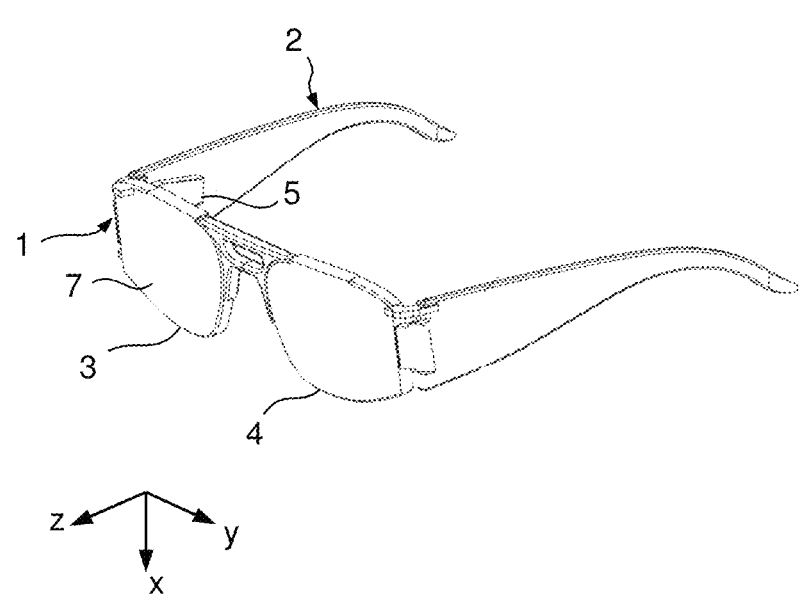
FIG. 1 shows a schematic perspective illustration of one embodiment of the display device.

In the case of the embodiment shown in FIG. 1, the display device 1 comprises a holding device 2, which can be placed onto the head of a user and can be formed e.g. in the manner of a conventional spectacle frame, and also a first spectacle lens 3 and a second spectacle lens 4, which are secured to the holding device 2. The holding device 2 with the spectacle lenses 3, 4 can be configured e.g. as sports goggles, sunglasses and/or spectacles for correcting defective vision, wherein a virtual image can be introduced into the user's field of view via the first spectacle lens 3, as described below.

For this purpose, the display device 1 comprises an image generating module 5, which can be arranged in the region of the right-hand spectacle earpiece of the holding device 2, as illustrated schematically in FIG. 1. The image generating module 5 can comprise a planar image generating element 6 (FIG. 2), such as e.g. an OLED chip, an LCD chip or an LCoS chip or a tilting mirror matrix, having a multiplicity of pixels arranged e.g. in rows and columns.

Figure 2:
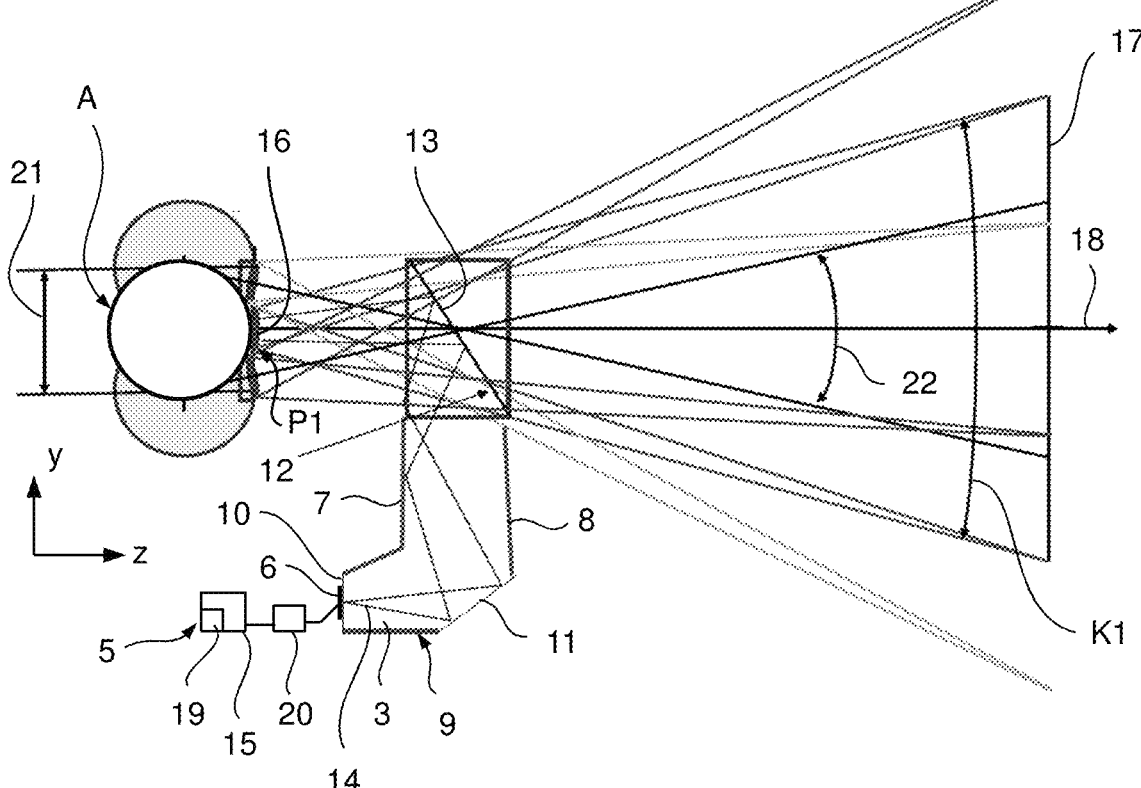
FIG. 2 shows an enlarged partial sectional view of the first spectacle lens, including a schematic illustration of the image generating module.

As can be best seen from the enlarged, schematic partial sectional view in FIG. 2, the first spectacle lens 3 comprises a back side 7 and a front side 8. The back side 7 and the front side 8 are shown as plane surfaces here. However, it is also possible for the back side 7 and/or the front side 8 to be configured in curved fashion. By way of example, a spherical curvature or an aspherical curvature can be present.

The spectacle lens 3 laterally comprises an input coupling portion 9 having an entrance surface 10, which can be configured in plane or curved fashion, and a deflection surface 11, which can likewise be configured in plane or curved fashion. The deflection surface 11 can be configured in particular as a reflective surface. However, the deflection can also be brought about by total internal reflection.

Furthermore, the first spectacle lens 3 comprises an output coupling portion 12 having a deflection structure 13. The output coupling portion 12 is spaced apart from the input coupling portion 9 along a first direction (here the y-direction). The deflection structure 13 can be configured as a mirror surface 13 comprising a predetermined extent along the first direction. The mirror surface 13 can be configured in plane fashion. It can be partly transparent, depending on the application. In this case, the user can perceive the generated virtual image superimposed with the surroundings. However, it is also possible for the mirror surface 13 to have the highest possible reflectivity. This is advantageous in particular for applications in which the user is intended to perceive only the virtual image and not the surroundings.

A light beam 14 can emanate from each pixel of the image generator 6. The desired image can be generated by appropriate control of the pixels of the image generator 6 by means of a control unit 15, which comprises a processor 19 and can be part of the image generating module 5. In FIG. 2, the beam path of one light beam 14 is depicted as representative of the light beams 14.

The light beam 14 emanating from the image generator 6 enters the spectacle lens 3 via the entrance surface 10 and is deflected by the deflection surface 11 such that a reflection takes place at the back side 7 (e.g. total internal reflection) and, as a result, the light beam 14 impinges on the mirror surface 13, which brings about a deflection in the direction toward the back side 7 in such a way that the light beam 14 emerges from the first spectacle lens 3 via the back side 7. In this case, the deflection is brought about in such a way that the output coupling direction along which the light beam 14 emerges via the back side 7 corresponds to the −z-direction.

As is furthermore indicated in the schematic illustration in FIG. 2, the first spectacle lens 3 here is configured such that an intermediate imaging of the image generated by means of the image generator 6 is present within the spectacle lens 3 between input coupling portion 9 and output coupling portion 12. However, such an intermediate imaging is not absolutely necessary.

As is shown in FIG. 2, the extent of the image generator 6 in the first direction (y-direction) is smaller than the corresponding extent of the entrance surface 10, and the image generator 6 is arranged centrally upstream of the entrance surface 10 relative to the first direction. In this case, the exit pupil 16 of the display device 1 lies at the position identified by the arrow P1, and so a user who is wearing the display device on their head and has positioned their eye A at this position P1 can perceive a virtual image in front of the front side 8, as is illustrated schematically in FIG. 2. The corresponding field of view is indicated by the double-headed arrow K1. A user can thus perceive the virtual image 17 in the case of the eye position in accordance with FIG. 2 and when looking straight ahead (viewing direction 18 in FIG. 2).

In the case of the display device, the image generator 6 can be displaced along the first direction (y-direction) by means of a positioning unit 20 under the control of the control unit 15, such that different input coupling locations can be adjusted. The input coupling location can relate to a predetermined point of the image generator 6 (for example the center of the image generator 6 or the upper or lower edge in the y-direction).

Figure 3:
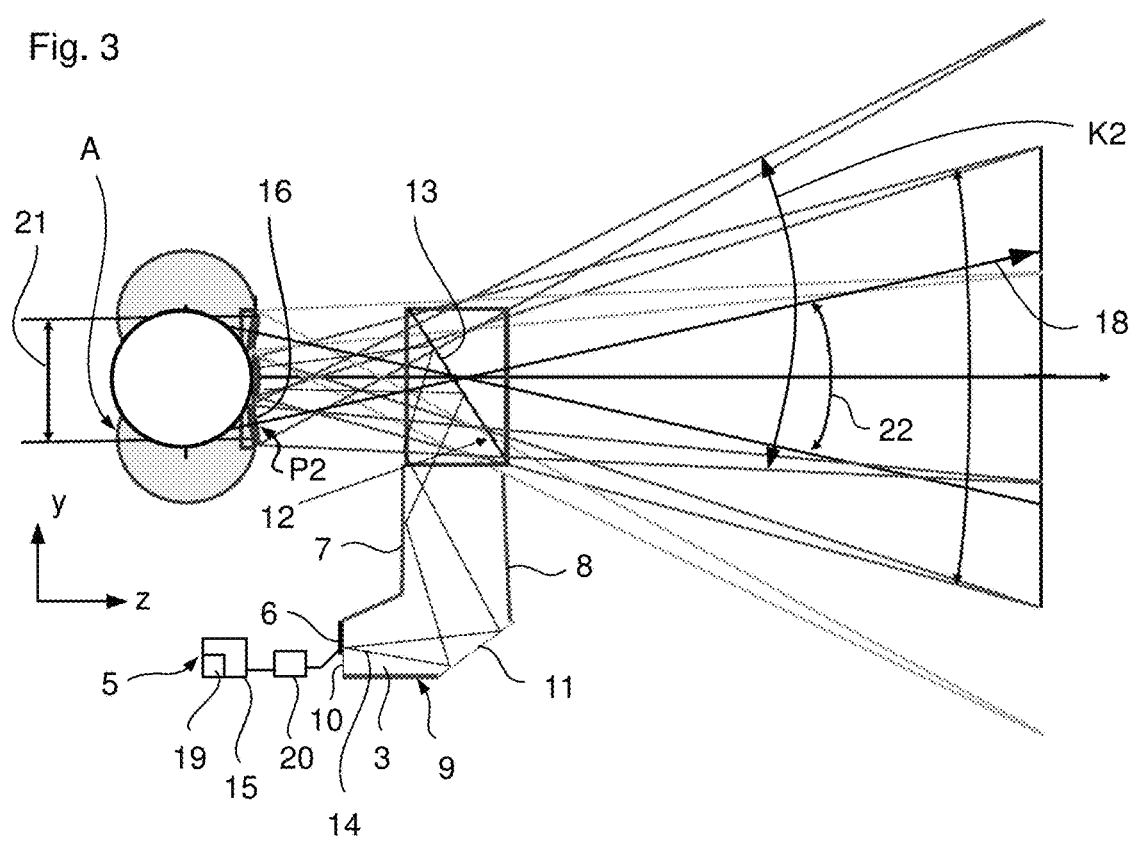
FIG. 3 shows an illustration in accordance with FIG. 2.

If the image generator 6 is positioned in a manner as shown in FIG. 3, the imaging of the display device has the effect that the output coupling direction then no longer runs along the −z-direction, but rather is inclined with respect thereto. This leads to a lateral (in the y-direction) displacement of the exit pupil 16, such that the user's eye A must be positioned at the position P2 in order to be able to perceive the virtual image (double-headed arrow K2). The viewing direction 18 of the user is likewise inclined in comparison with FIG. 2.

Figure 4:
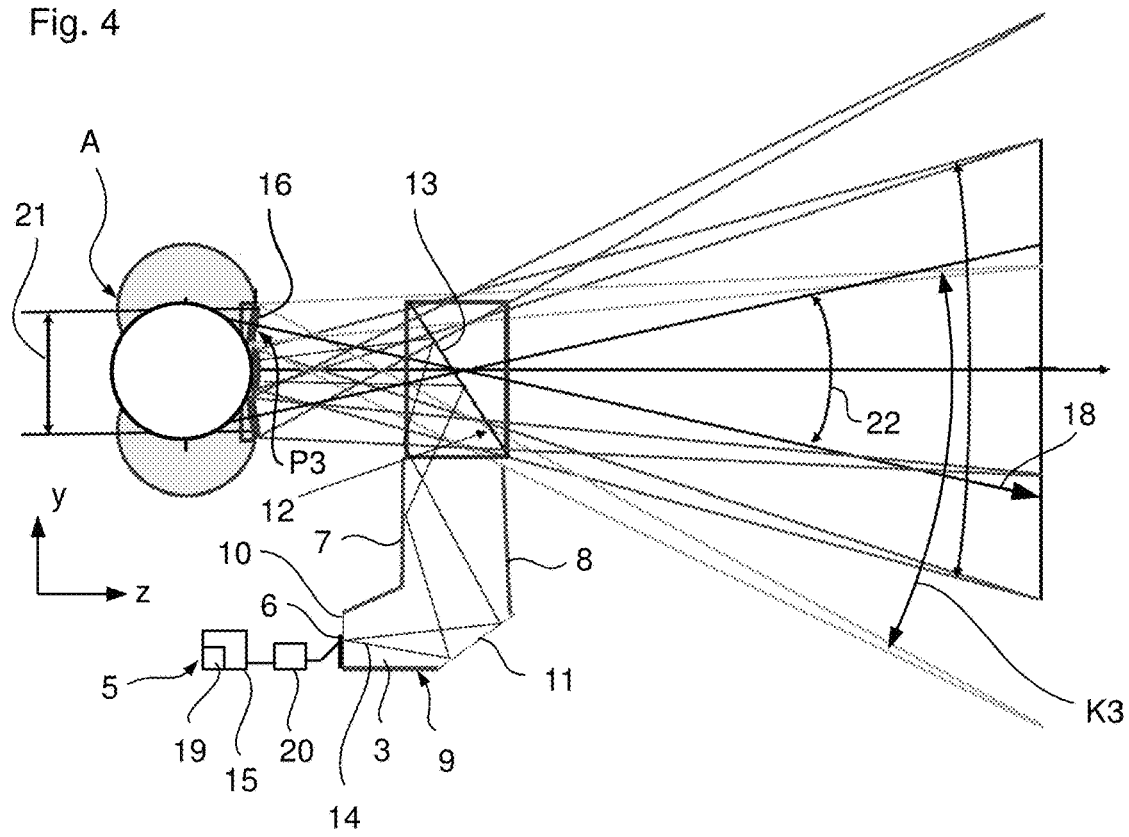
FIG. 4 shows an illustration in accordance with FIG. 2.

In the case of the position of the image generator 6 in accordance with FIG. 4, the output coupling direction once again changes, such that the exit pupil 16 is laterally displaced. The user's eye AND must be positioned at a corresponding location (arrow P3) in order to be able to perceive the virtual image (double-headed arrow K-3). The viewing direction 18 of the user is likewise inclined in comparison with FIG. 2.

As is discernible from FIGS. 2 to 4, the lateral position of the exit pupil 16 (along the y-direction) is adjustable by way of selecting the input coupling location of the image generator 6 upstream of the entrance surface 10, such that the display device 1 is easily adjustable to different temple-eye distances of the individual users.

The range 21 of the possible pupil positions leads to an angular range 22 of the assigned viewing direction 18.

As is furthermore discernible from FIGS. 2 to 4, irrespective of the input coupling location, when the deflection structure 13 causes a deflection, the deflection structure 13 is always utilized over the entire predetermined extent along the first direction.

Figure 5:
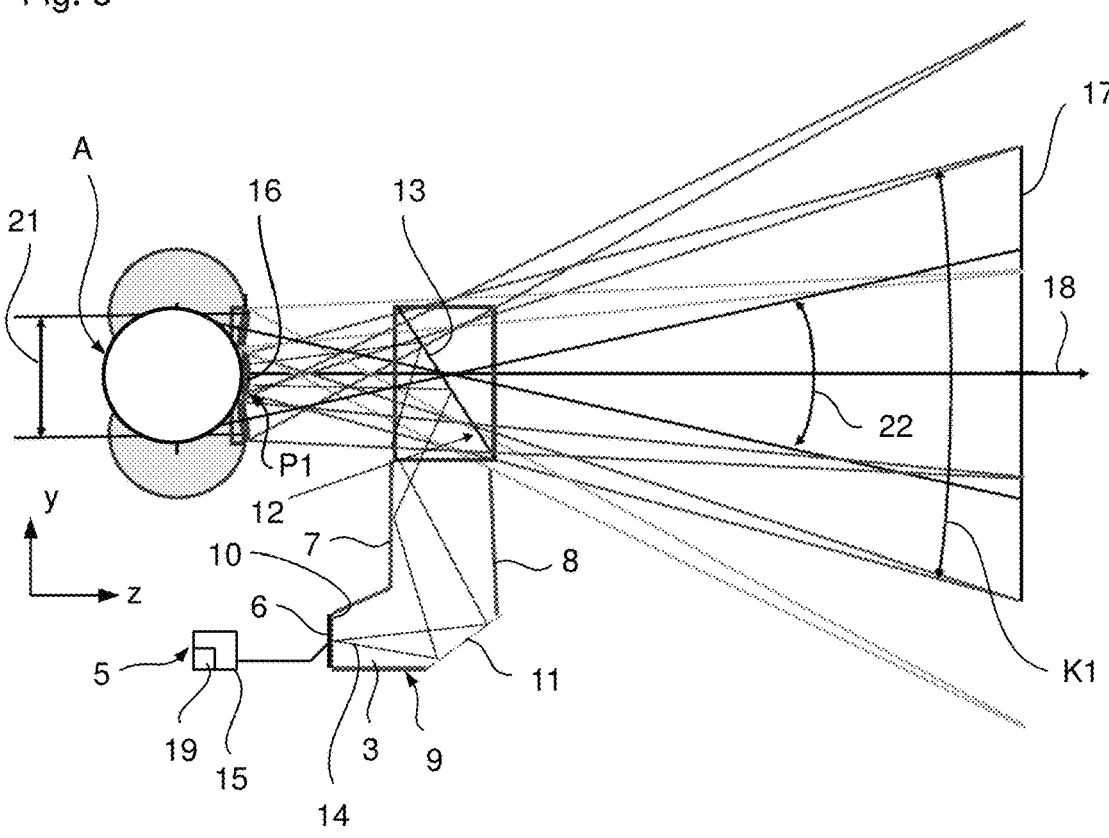
FIG. 5 shows an illustration in accordance with FIG. 2 of a further embodiment.

In a modification (FIG. 5), the extent of the image generator 6 in the first direction (y-direction) is of exactly the same magnitude as, or larger than, the corresponding extent of the entrance surface 10, such that the image generator 6 itself does not have to be displaced in order to produce different input coupling locations for the generated image. Just the corresponding region on the image generator 6 is controlled in order to generate the image, such that the input coupling location for the generated image can vary in the y-direction. The positioning unit 20 can be omitted in this case.

In the case of the embodiments described, the spectacle lens 3, for the image of the image generator 6, is configured as an imaging optical unit which images the image generated by means of the image generator 6 such that the user can perceive it as a virtual image. As already mentioned, the imaging optical unit can be configured such that an intermediate imaging, and thus an intermediate image, is present within the spectacle lens 3. As a result, the cross-section of the spectacle lens 3 can be reduced, and so a compact design can be realized. Furthermore, the intermediate image results in the optical path length becoming longer, into which one or two additional correction mirrors, for example, can then be introduced. This enables the imaging optical unit to be corrected more easily and more flexibly, and a better distortion and spot size can be achieved.

Figure 6:
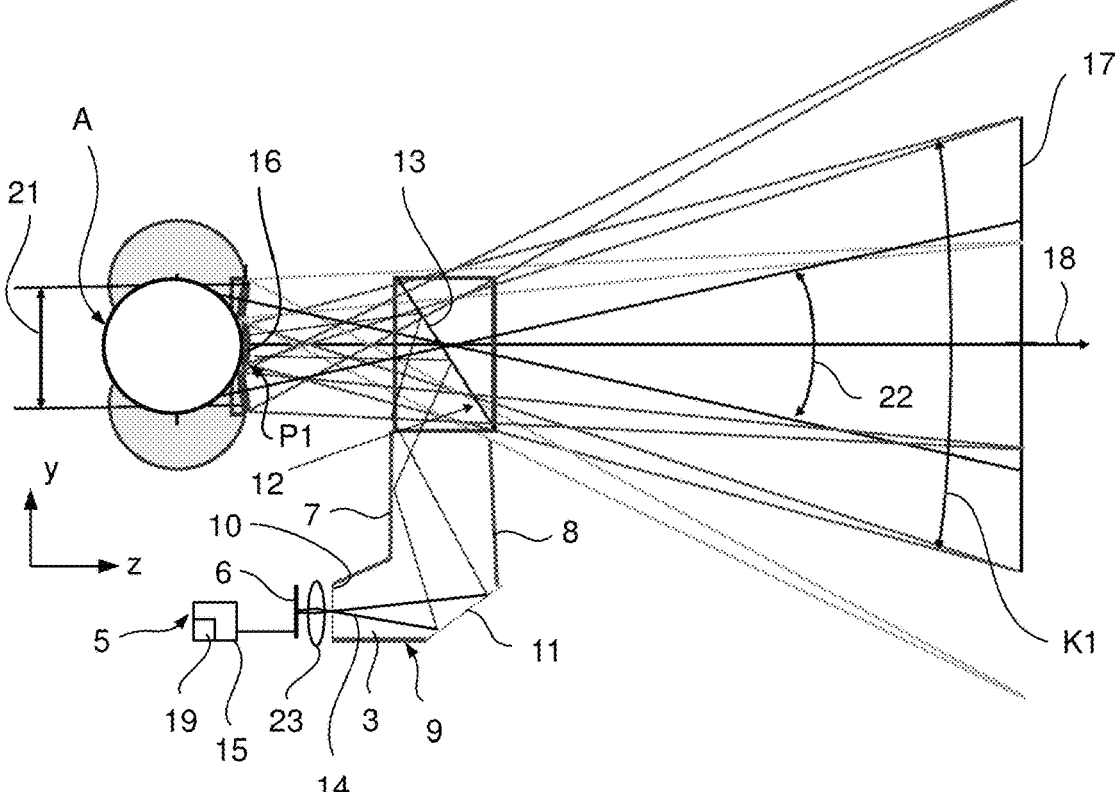
FIG. 6 shows an illustration in accordance with FIG. 2 of a further embodiment.

As is shown in the exemplary embodiment in FIG. 6, a further optical unit (illustrated schematically here as a lens element 23) can be provided between the image generator 6 and the entrance surface 10. It is thereby possible once again to achieve easier and more flexible correction with better distortion and spot size. The embodiment in FIG. 6 is a modification of the embodiment in FIG. 5. Of course, this modification described in association with FIG. 6 can also be provided in the case of the embodiment in accordance with FIGS. 2 to 4.

Figure 7:
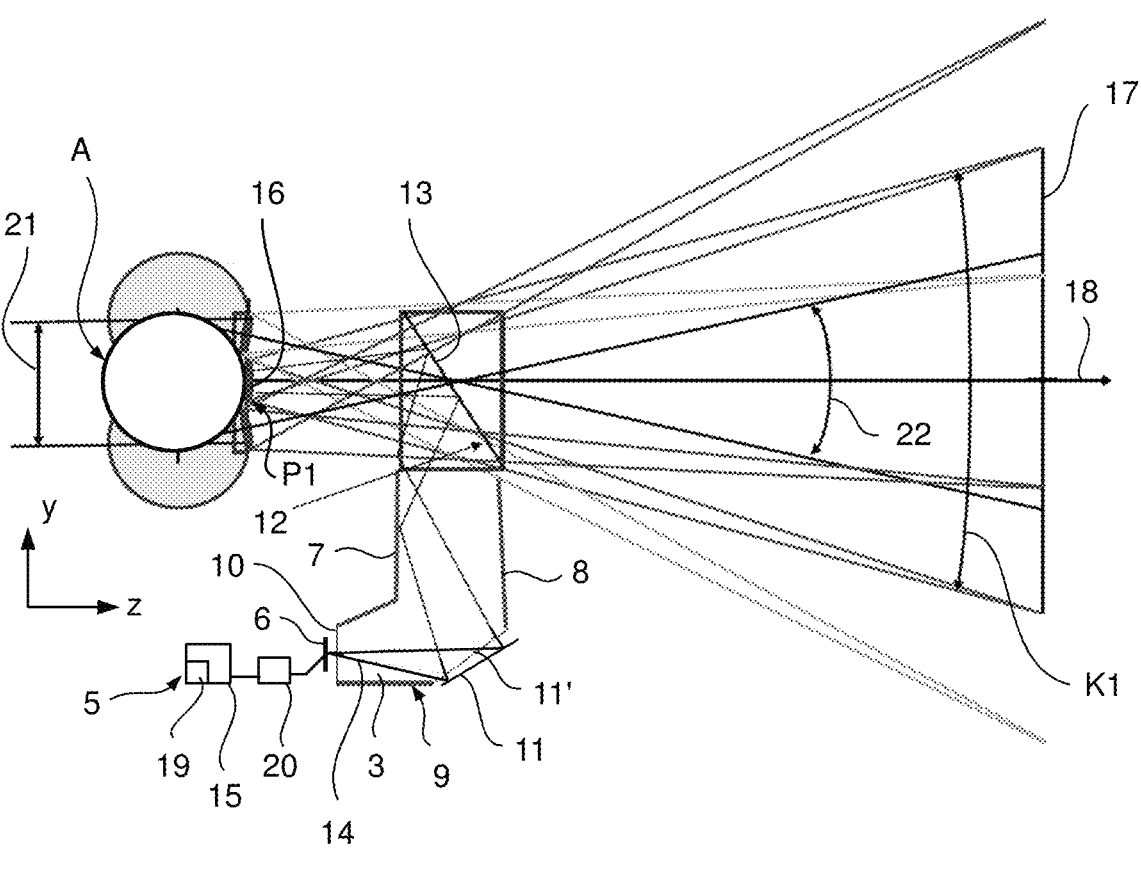
FIG. 7 shows an illustration in accordance with FIG. 2 of a further embodiment.

FIG. 7 illustrates a modification of the embodiment in accordance with FIG. 2.

Firstly, in the case of this embodiment, the image generator 6 is spaced apart from the entrance surface 10. In this case, it is possible, in particular, for there to be no further optical element between the image generator 6 and the entrance surface 10. Such spacing apart of the image generator 6 from the entrance surface can also be provided in the case of the embodiments in accordance with FIGS. 2 to 5.

Secondly, the deflection surface 11 is designed to be tiltable in such a way that there is an air space between the spectacle lens 3 and the deflection surface 11. The light beam 14 therefore emerges from the spectacle lens 3 via the surface 11', impinges on the deflection surface 11, is reflected at the latter and enters the spectacle lens 3 once again via the service 11'. The choice of the tilt angle of the deflection surface 11 can be used in addition to the position of the image generator 6 along the y-direction in order to bring about the described displacement of the exit pupil 16 in the y-direction. Alternatively, it is possible for the display device to be configured such that the described displacement of the exit pupil 16 along the y-direction is effected only by way of the choice of the tilt angle of the deflection surface 11.

Both described features of the distance between the image generator 6 and the entrance surface 10 and the tiltable arrangement of the deflection surface 11 can be provided individually or jointly in all of the embodiments described.

Furthermore, the spectacle lens is easy to manufacture since the entrance surface 10 and adjacent surfaces are situated at relatively similar positions in the z-direction, but these are at a sufficient distance from one another. Optically used surfaces are preferably involved here, such as the entrance surface 10, the deflection surface 11 and the front and back sides 8, 7. It is thus possible to provide an injection-molding tool for producing the spectacle lens 3 with a transition between the surfaces that is readily releasable from the mold.

The imaging optical unit can be realized in telecentric fashion on the image generator side. This affords the advantage that a z-displacement of the image generator 6 leads to a displacement of the virtual image position along the z-direction, without in the process altering the field of view for the user and thus the position of the exit pupil 16, which may also be referred to as eyebox. For displacing the image generator 6 along the z-direction, it is possible for example for the positioning unit 20 to be configured accordingly and then to be controlled by way of the control unit 15.

The illustration in FIGS. 2 to 6 is highly schematic. Preferably, after the deflection at the deflection surface 11, a reflection at the front side 8 takes place followed by a reflection at the back side and the deflection at the mirror surface 13.

In the case of the display device 1, the virtual image is introduced into the user's field of view via the first spectacle lens 3. It is of course also possible for it to be introduced via the second spectacle lens 4. Furthermore, the display device 1 can be configured such that information or virtual images can be introduced via both spectacle lenses 3, 4. In this case, the introduction can take place in such a way that the impression of a three-dimensional image is created. However, this is not mandatory.

The spectacle lenses 3, 4 can have a refractive power of zero or a refractive power other than zero (in particular for correcting defective vision). In particular, both the front side 8 and the back side 7 can be configured in curved fashion. The front side is spherically curved, in particular. If the spectacle lens 3, 4 has a refractive power other than zero in order to correct defective vision, the curvature of the back side 7 is generally chosen appropriately in order to achieve the corresponding correction. The back side 7 can comprise a curvature deviating from the spherical shape.

The holding device 2 need not be configured as a spectacle-like holding device. Any other kind of holding device by which the display device 1 can be placed and worn on the head is also possible.

While the invention has been described in connection with what is presently considered to be the most practical and preferred embodiments, it will be apparent to those of ordinary skill in the art that the invention is not to be limited to the disclosed embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products. Moreover, features or aspects of various example embodiments may be mixed and matched (even if such combination is not explicitly described herein) without departing from the scope of the invention.

The invention claimed is:

1. A display device, comprising:
   a holding device that can be placed onto the head of a user;
   an image generator to generate an image, the image generator being secured to the holding device,
   a control unit to control the image generator, and
   a spectacle lens secured to the holding device, integrally comprising:
   an input coupling portion; and
   an output coupling portion spaced apart therefrom along a first direction,
   wherein the output coupling portion comprises a deflection structure having a predetermined extent in the first direction, and
   wherein the generated image is coupled into the spectacle lens via the input coupling portion, is guided in the spectacle lens by way of at least one reflection as far as the output coupling portion and is coupled out via the output coupling portion by way of deflection at the deflection structure along an output coupling direction into an exit pupil, such that, in the state in which the holding device has been placed on the head, the user can perceive the coupled-out image as a virtual image,
   wherein the input coupling portion comprises an entrance surface, which is wider than the image of the image generator in the first direction, and wherein an input coupling location of the entrance surface at which the image is coupled in via the entrance surface is adjustable in the first direction, wherein the input coupling location defines the output coupling direction of the output coupling portion and thus the position of the exit pupil in the first direction, such that the distance between the exit pupil and the input coupling portion along the first direction is adjustable, and wherein irrespective of the input coupling location, when the deflection structure causes a deflection, the deflection structure is always utilized over an entirety of the predetermined extent along the first direction.

2. The display device as claimed in claim 1, wherein the display device is configured such that an intermediate imaging of the image is present between input coupling portion and output coupling portion.

3. The display device as claimed in claim 2, wherein the spectacle lens further comprises a front side and a back side, and the input coupling portion comprises a deflection surface disposed downstream of the entrance surface, the image coupled in via the entrance surface being reflected to the front side at said deflection surface, such that at the front side a reflection takes place in the direction toward the back side, at which the image is reflected and impinges directly on the deflection structure.

4. The display device as claimed in claim 1, wherein the spectacle lens further comprises a front side and a back side, and the input coupling portion comprises a deflection surface disposed downstream of the entrance surface, the image coupled in via the entrance surface being reflected to the front side at said deflection surface, such that at the front side a reflection takes place in the direction toward the back side, at which the image is reflected and impinges directly on the deflection structure.

5. The display device as claimed in claim 4, wherein the deflection structure is a single continuous mirror surface.

6. The display device as claimed in claim 4, wherein a positioning unit is provided, which is configured to move the image generator along the first direction for the purpose of adjusting the input coupling location.

7. The display device as claimed in claim 4, wherein the image generator generates the image such that, in the first direction, the image has a smaller extent than the extent of the image generator in the first direction, and the adjustment of the input coupling location is carried out by way of selecting the position of the generated image on the image generator.

8. The display device as claimed in claim 7, wherein the extent of the image generator in the first direction corresponds at least to the extent of the entrance surface in the first direction.

9. The display device as claimed in claim 4, wherein an optical unit is arranged between the image generator and the entrance surface and, together with the spectacle lens, brings about the imaging of the generated image as the virtual image.

10. The display device as claimed in claim 1, wherein the deflection structure is a single continuous mirror surface.

11. The display device as claimed in claim 1, wherein a positioning unit is provided, which moves the image generator along the first direction for the purpose of adjusting the input coupling location.

12. The display device as claimed in claim 1, wherein the image generator generates the image such that, in the first direction, the image has a smaller extent than the extent of the image generator in the first direction, and the adjustment of the input coupling location is carried out by way of selecting the position of the generated image on the image generator.

13. The display device as claimed in claim 12, wherein the extent of the image generator in the first direction corresponds at least to the extent of the entrance surface in the first direction.

14. The display device as claimed in claim 1, wherein an optical unit is arranged between the image generator and the entrance surface and, together with the spectacle lens, brings about the imaging of the generated image as the virtual image.

* * * * *